(12) United States Patent
Pidduck (10) Patent No.: US 10,599,690 B2
(45) Date of Patent: *Mar. 24, 2020

(54) SYSTEMS AND METHODS FOR GENERATING AND USING AGGREGATED SEARCH INDICES AND NON-AGGREGATED VALUE STORAGE

(71) Applicant: OPEN TEXT SA ULC, Halifax (CA)

(72) Inventor: Patrick Thomas Sidney Pidduck, Waterloo (CA)

(73) Assignee: OPEN TEXT SA ULC, Halifax (CA)

( * ) Notice: Subject to any disclaimer, the term of this patent is extended or adjusted under 35 U.S.C. 154(b) by 273 days.

This patent is subject to a terminal disclaimer.

(21) Appl. No.: 15/465,192

(22) Filed: Mar. 21, 2017

(65) Prior Publication Data

US 2017/0193080 A1 Jul. 6, 2017

Related U.S. Application Data

(63) Continuation of application No. 13/591,684, filed on Aug. 22, 2012, now Pat. No. 9,626,434.

(60) Provisional application No. 61/529,097, filed on Aug. 30, 2011.

(51) Int. Cl.
| | |
|---|---|
| G06F 16/31 | (2019.01) |
| G06F 16/38 | (2019.01) |
| G06F 16/13 | (2019.01) |
| G06F 16/22 | (2019.01) |

(52) U.S. Cl.
CPC .......... *G06F 16/316* (2019.01); *G06F 16/134* (2019.01); *G06F 16/22* (2019.01); *G06F 16/38* (2019.01)

(58) Field of Classification Search
CPC ....................................................... G06F 16/22
See application file for complete search history.

(56) References Cited

U.S. PATENT DOCUMENTS

| | | | |
|---|---|---|---|
| 6,374,232 B1 | 4/2002 | Dageville et al. | |
| 6,728,720 B1 | 4/2004 | Lenzie | |
| 6,772,141 B1 | 8/2004 | Pratt et al. | |
| 6,778,985 B1 * | 8/2004 | Jenkins, Jr. | ............. G06F 16/30 |
| 7,548,898 B1 * | 6/2009 | Tarenskeen | ........... G06F 16/214 |

(Continued)

OTHER PUBLICATIONS

Microsoft Computer Dictionary, 5th edition. (c)2002, 4 pages.*

(Continued)

*Primary Examiner* — Charles E Lu
(74) *Attorney, Agent, or Firm* — Sprinkle IP Law Group (57) ABSTRACT

Systems, methods and computer program products for using searchable aggregate indices associated with non-aggregated value storage. In one method, a search system stores metadata values for each of a plurality of objects in a storage unit. The metadata values are stored in corresponding value storage locations that are associated with an identifiable metadata fields. An aggregate index is provided which includes a dictionary of terms that are contained in metadata values associated with a designated set of the metadata fields. The aggregate index is searched for one or more specific search terms, and one or more of the metadata values are retrieved from the value storage locations in response to the search, where the individual metadata fields associated with the retrieved metadata values are identified.

20 Claims, 5 Drawing Sheets

(56) References Cited

U.S. PATENT DOCUMENTS

| | | |
|---|---|---|
| 8,442,994 B1 | 5/2013 | Chen et al. |
| 9,626,434 B2 | 4/2017 | Pidduck |
| 2003/0033275 A1 | 2/2003 | Alpha et al. |
| 2003/0078915 A1* | 4/2003 | Chaudhuri ........ G06F 16/24578 |
| 2005/0187917 A1 | 8/2005 | Lawande et al. |
| 2015/0081717 A1 | 3/2015 | Pidduck |

OTHER PUBLICATIONS

FAQ—Solr Wiki, last updated Aug. 17, 2011 by Hoss Man, 12 pages, retrieved from <<http://wiki.apache.org/solr/FAQ>>.
Office Action issued for U.S. Appl. No. 13/591,684, dated Sep. 9, 2014, 8 pages.
Office Action issued for U.S. Appl. No. 13/591,684, dated Feb. 6, 2015, 10 pages.
Office Action issued for U.S. Appl. No. 13/591,684, dated May 18, 2015, 12 pages.
Office Action issued for U.S. Appl. No. 13/591,684, dated Sep. 1, 2015, 15 pages.
Office Action issued for U.S. Appl. No. 13/591,684, dated Dec. 16, 2015, 15 pages.
Office Action issued for U.S. Appl. No. 13/591,684, dated May 17, 2016, 16 pages.
Office Action issued for U.S. Appl. No. 13/591,684, dated Aug. 23, 2016, 13 pages.
Office Action issued for U.S. Appl. No. 13/591,684, dated Dec. 12, 2016, 5 pages.

* cited by examiner

| OBJECT ID | AUTHOR ID | OWNER ID | EDITOR ID | AUTHOR NAME | OWNER NAME | CREATOR NAME | EDITOR NAME | TEXT |
|---|---|---|---|---|---|---|---|---|
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |

SYSTEMS AND METHODS FOR GENERATING AND USING AGGREGATED SEARCH INDICES AND NON-AGGREGATED VALUE STORAGE

CROSS-REFERENCE TO RELATED APPLICATIONS

This is a continuation application of U.S. patent application Ser. No. 13/591,684, filed Aug. 22, 2012, entitled "SYSTEMS AND METHODS FOR GENERATING AND USING AGGREGATED SEARCH INDICES AND NON-AGGREGATED VALUE STORAGE," which is a conversion of and claims a benefit of priority from U.S. Provisional Application No. 61/529,097, filed Aug. 30, 2011, entitled "SYSTEM AND METHOD OF SEARCH INDEXES USING AGGREGATE METADATA FIELDS," both of which are fully incorporated by reference herein for all purposes.

TECHNICAL FIELD

This disclosure relates generally to the field of computerized search systems, and more particularly to systems, methods and products which utilize aggregate indices to facilitate searches, but still enable the identification of specific fields associated with retrieved data.

BACKGROUND OF THE RELATED ART

When indexing objects into a search system, a large number of metadata fields may be required. The large number of metadata fields significantly increases the size of a search index. Further, the large number of metadata fields requires complex, intricate and/or multiple search queries to search within the metadata fields of the search index. Accordingly, searching indices with numerous metadata fields is computationally expensive.

Conventional art provides an alias to represent a large number of metadata fields. While the alias implementation may simplify the search query, indices for the related metadata field still exist and are independently searched. Therefore, the additional metadata fields consume memory and/or disk space, and the search performance of the aliases is not efficient because the searches must be performed against each metadata field.

In other embodiments of the conventional art, individual metadata fields are combined into a single field. Because there is only a single combined field instead of the many separate fields, only a single query is needed to search the combined field. As a result, memory and disk space may be saved, and searches may be faster and more efficient. When blending the metadata fields into a single field, however, the metadata values are combined into value storage for the single metadata field. Consequently, the ability to separately extract values for the metadata fields that were combined, or to identify values as being associated with a particular one of these individual metadata fields is lost. Accordingly, a user is not able to search the combined metadata field for values in specific ones of the original fields, or to retrieve values identifiable as being associated with a particular one of the original fields.

It would therefore be desirable to provide a search mechanism that has the benefits of reduced overhead and increased search performance, without sacrificing the ability to identify retrieved metadata values as being associated with specific ones of the original metadata fields.

SUMMARY OF THE DISCLOSURE

Embodiments disclosed herein provide systems, methods, and computer program products for searching using an aggregate index. A set of objects have metadata associated with multiple metadata fields. The aggregate index has a dictionary of terms that are contained in a designated set of at least two of the metadata fields. While the terms found in the metadata values for these fields are combined in the aggregate index, the values themselves are stored in a manner that enables the identification of the specific field associated with each of the values. As a result, a search of the aggregate index can identify objects for which a search query is satisfied by values from the combined metadata fields, but the field-specific values can still be determined. For instance, a search may identify objects for which the term "john" is contained in any of metadata fields A, B or C, and it can be determined which of these fields contains this term, which is not possible with conventional search systems.

One embodiment comprises a method for using a searchable aggregate index. In this method, a search system stores metadata values for each of a plurality of objects in a storage unit, where the metadata values are stored in corresponding value storage locations, each of which is associated with an identifiable metadata field. The search system provides an aggregate index which includes a dictionary of terms that are contained in metadata values associated with a designated set of the metadata fields. The search system enables a search of the aggregate index using a specific search query and enables retrieval of one or more of the metadata values from the value storage locations in response to the search. The retrieved metadata values are associated with ones of the objects which have metadata values that contain the specific search term. The retrieved metadata values may or may not contain the specific search term. The search system also enables identification of the metadata fields with which each of the retrieved metadata values is associated.

In the context of this disclosure, the phrase "search term" represents a technical concept or interpretation. For example, a search term in the context of this disclosure can be a word, a string, or any combination of the following:
 phrases
 numbers
 strings
 logical operations (e.g., AND, OR, NOT, etc.)
 ordering or operations (e.g., using parenthesis)
 relationships (e.g., greater than, less than, not equal to, etc.)
 similarities based on thesaurus, stemming, sounds-like, etc.
 wildcards and pattern matching
To this end, a search term can also refer to any term that is used in a query and that has been modified or generated by any commonly used techniques.

For context, a search term could be a word "john" or a more complex expression like: (>"bob" or !=("123" or a*)) and (sounds-like "smith" or thesaurus "doctor" or "medical doctor" or stem "medical").

In addition to the aggregate index, the search system may also provide one or more metadata-specific indices. Each of the metadata-specific indices is associated with a particular one of the metadata fields. Each metadata-specific index has a dictionary which contains only those terms that are contained in metadata values associated with the corresponding metadata field. The search system may also have multiple aggregate indices. Each of the aggregate indices may include terms associated with a different set of the metadata fields. There may be any number of aggregate indices and any number of metadata-specific indices.

When the metadata values are retrieved from the value storage locations in response to a search of the aggregate index, the system may, in some embodiments, identify objects that have metadata values that contain the searched terms and then retrieve all metadata values associated with those objects. In other embodiments, the search system may retrieve only values associated with specified metadata fields, whether or not those fields contain the searched terms. In still other embodiments, the search system may retrieve only metadata values that contain the searched terms.

The method may also include generating the aggregate index in addition to using this index. In one embodiment, the search system analyzes the objects, identifies search terms in the objects, and generates a dictionary for the aggregate index. The dictionary contains ones of the identified search terms that are associated with the designated set of the metadata fields. For each of the identified search terms, the dictionary may indicate which ones of the objects and/or which ones of the metadata values associated with the objects contain the identified search term.

Another embodiment may include a computer program product in which a non-transitory computer readable medium stores a set of computer instructions. The instructions are executable by a computer system to perform a method such as described above. Still another embodiment comprises a search system. This system may, for example, include a central processing unit and a data storage unit. The central processing unit and data storage unit are configured to perform methods such as are described above.

Other alternative embodiments are also possible.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Before discussing specific embodiments, an exemplary hardware architecture for implementing certain embodiments is described herein. One embodiment can include one or more computers that may be communicatively coupled to one or more networks. As is known to those skilled in the art, a computer may include one or more central processing units ("CPUs"), one or more read-only memories ("ROMs"), one or more random access memories ("RAMs"), one or more hard drives ("HDs"), and one or more input/output ("I/O") device(s). The I/O devices can include keyboards, monitors, printers, electronic pointing devices (such as a mouse, trackball, stylus, etc.) or the like. In various embodiments, the computer has access to one or more storage devices.

ROM, RAM, and HD are computer memories for storing data and computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

Document management systems often employ search engines to allow for fast retrieval of information. A search engine can search the metadata and text of documents in a search index to determine which documents match search criteria without having to parse the document itself.

Embodiments of a search engine described herein include an aggregate search index. The aggregate index combines or includes a plurality of metadata fields into a single index. While the metadata fields are combined, the separate value storage locations for the original metadata fields are maintained. Because each metadata field retains a unique identity, values for each individual metadata field can be retrieved, even though the values in the metadata fields are searchable in a single index.

Figure 1:
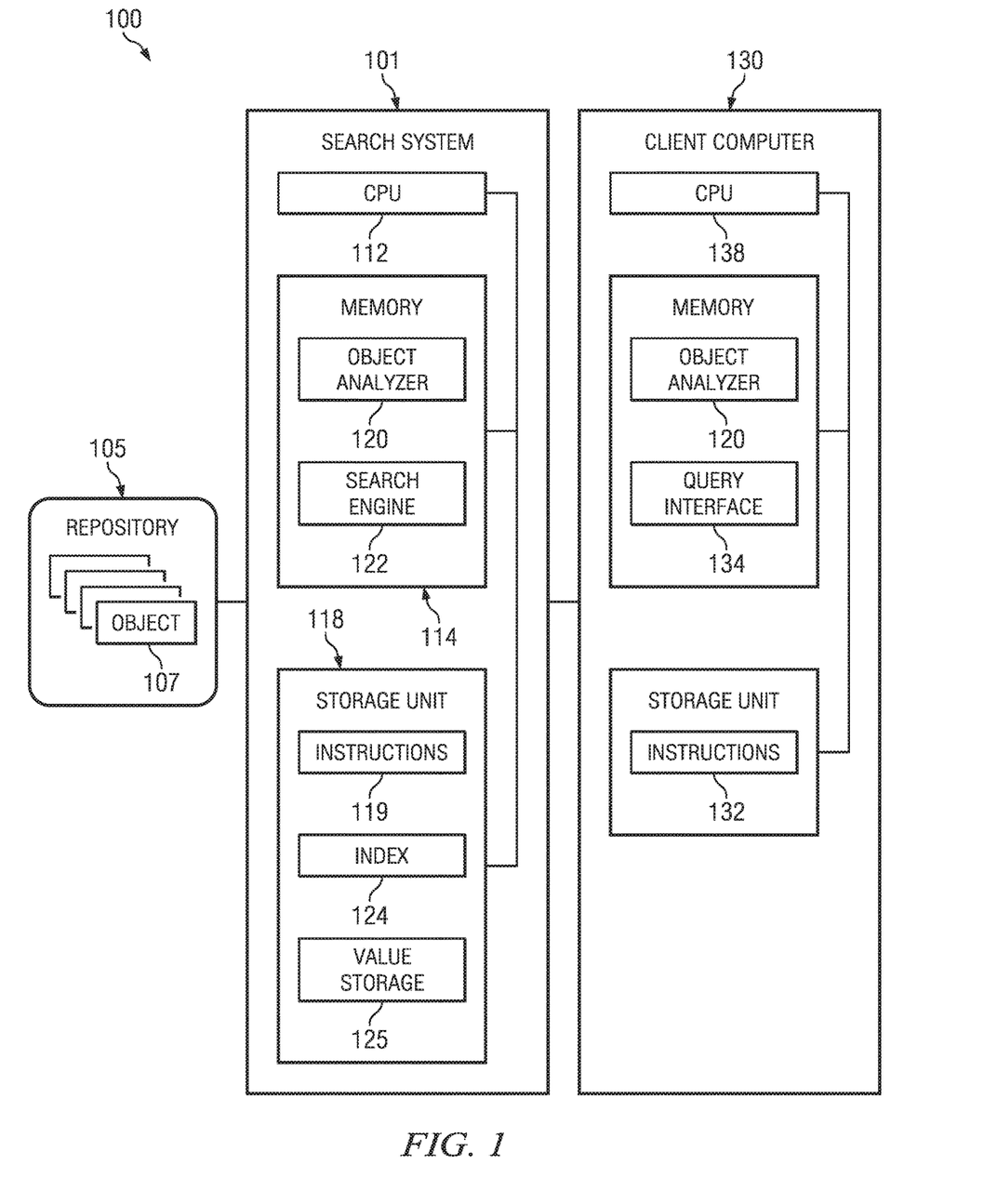
FIG. 1 depicts a functional block diagram illustrating a computing environment in which one embodiment can be implemented.

FIG. 1 is a block diagram illustrating one embodiment of a computing environment 100 with object search system 101. Computing environment 100 includes an object repository 105 storing objects 107 of interest (documents, images, emails or other objects that may be searched). Object repository 105 may comprise a file server or database system or other storage mechanism remotely or locally accessible by search system 101.

In the embodiment of FIG. 1, search system 101 comprises a server having a central processing unit 112 connected to a memory 114 and storage unit 118 via a bus. Central processing unit 112 may represent a single processor, multiple processors, a processor(s) with multiple processing cores and the like. Storage unit 118 may include a non-transitory storage medium such as hard-disk drives, flash memory devices, optical media and the like. Search system 101 may be connected to a data communications network (not shown).

Storage unit 118 stores computer executable instructions 119, an index 124, and value storage locations 125. Computer executable instructions 119 can represent multiple programs and operating system code. In one embodiment, instructions 119 are executable to provide an object analyzer 120 and search engine 122. Object analyzer 120 and search engine 122 may be portions of the same program or may be separate programs. According to one embodiment, for example, object analyzer 120 is a component of a document management system while search engine 122 is a separate program that interfaces with the document management system. Furthermore, object analyzer 120 and search engine 122 can be implemented on different computing systems and can, themselves, be distributed.

Index 124 includes metadata used to identify objects in response to a search query and may also include text used to identify objects. Index 124 can include a single index containing metadata and text, separate metadata and text indices or other arrangements of information. While shown as a single index, index 124 may include multiple indices.

Client computer system 130 may include components similar to those of the server of search system 101, such as a CPU, memory and storage. Additionally, client computer system 130 may include executable instructions 132 to provide a user interface 134 that allows a user to enter a search query. The user interface may be provided through a web browser, file system interface or other program.

The search system 101 of FIG. 1 is merely an example of a computing system and embodiments of a search system that may be implemented using other computing systems (e.g., desktop computers, laptops, mobile computing devices or other computing devices with adequate processing and memory) including multiple computers acting together to provide a search system (e.g., a cluster of servers or other computing devices connected by a network acting together to provide the search system). Similarly, client computer 130 may include any suitable desktop computer, laptop, mobile device, server or other computing system.

In operation, object analyzer 120 analyzes objects in object repository 105 to determine information to be indexed in index 124. Object analyzer 120 can send indexing instructions to search engine 122 to direct search engine 122 to add/modify/or delete metadata or text in index 124, as discussed below. When a search query is received, search engine 122 can search the information in index 124 to identify objects responsive to the search query and return a list or other representation of those objects to client computer 130.

Figure 2:
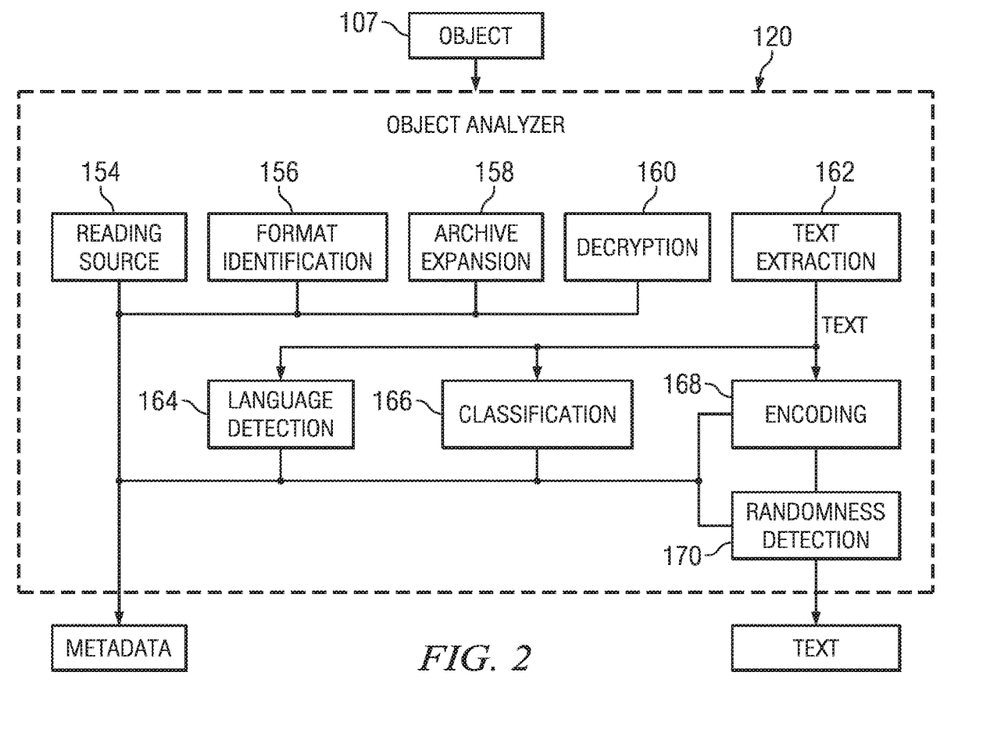
FIG. 2 depicts a functional block diagram illustrating one embodiment of an object analyzer.

FIG. 2 is a diagrammatic representation of one embodiment of an object analyzer 120 for analyzing an object 107. Object analyzer 120 can comprise various modules to process an object 107. Reading source data module 154 can open the object 107. Format identification module 156 examines the object to determine what type of file or data the object 107 comprises. Archive expansion module 158 unzips files or otherwise decompresses files if the object 107 is a compressed file. Decryption module 160 decrypts all or part of the data in the object 107. Text extraction module 162 applies rules to text in the object 107 to extract text for index 124. Language detection module 164 examines the text to determine the language in which the text is written. Classification module 166 applies rules based upon text and metadata to classify content. Encoding module 168 can convert text to a supported encoding. Randomness detection module 170 can analyze data to be indexed to reject random information.

Object analyzer 120 may include modules that derive metadata for the object 107. For example, a document management system may provide a limited amount of metadata with the object 107. Object analyzer 120 can derive other metadata from the metadata provided, text or other properties of the object 107. For example, the filter that extracts the text from a PowerPoint presentation might also create metadata about the presentation. For example, the number of slides in the presentation, the title of the file, the name of the presentation author stored in the PowerPoint file, or the size of paper the presentation was designed to print on. More complex examples of derived metadata might include statistical analysis to generate a list of keyword or key concepts in the document, determining the subject person or company of the text, sentiment analysis (the tone of the text—positive or negative), identification of physical locations and tagging with geographic coordinates, or language identification (in what language is the text written).

The embodiment of FIG. 2 is provided by way of example. Object analyzer 120 may include any number of other modules to analyze an object and extract text and metadata to be indexed. Object analyzer 120 may be a portion of a larger program (such as a document management program) may be a separate program or may be implemented according any suitable programming architecture. In one embodiment, the process of determining metadata and text to be indexed may be carried out by any number of different programs on a computer system or distributed across computer systems.

Figure 3:
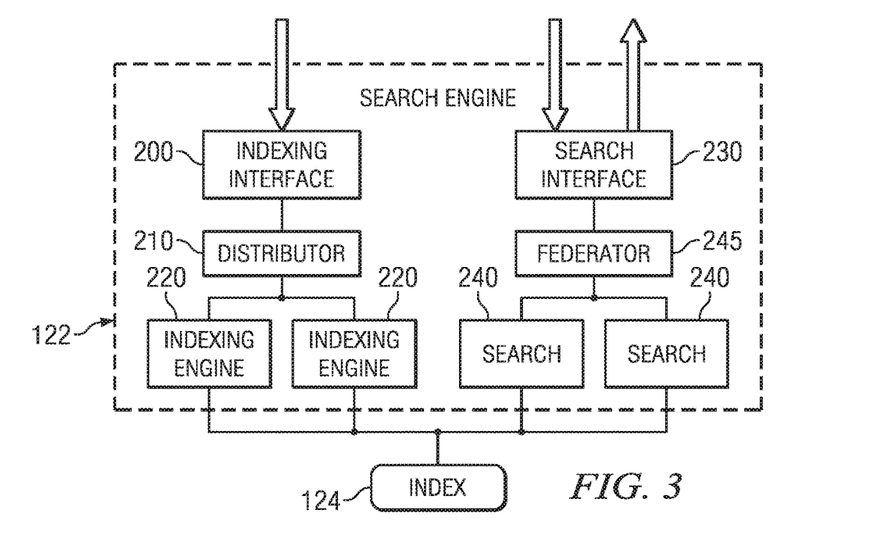
FIG. 3 depicts a functional block diagram illustrating one embodiment of a search engine.

FIG. 3 is a diagrammatic representation of logical blocks for one embodiment of a search engine 122. Search engine 122 may provide an indexing interface 200 that receives indexing requests (e.g., from object analyzer 120) or other source. A distributor module 210 may distribute the indexing requests to indexing engines 220 that act on the indexing request to update index 124. Search engine 122 may also include a search interface 230 to receive queries (e.g., from a content server or other source). Search interface 230 may send queries to search modules 240. Federator 245 gathers the results from all search modules together and generates a response to the query received through search interface 230. Search modules 240 are responsible for performing searches on an index or a partition (i.e., a portion of an index), computing relevance score, sorting results, and retrieving metadata regions to return in a query.

The embodiment of FIG. 3 is provided by way of example. Search engine 122 may include any number of other modules or configurations to update and search an index. For example, search modules 240 and indexing engines 220 may be a single module. Search engine 122 may be a portion of a larger program, such as a document management program, may be a separate program or may be implemented according any suitable programming architecture. In one embodiment, the processes of search engine 122 may be distributed across multiple computer systems. Furthermore, while in FIG. 3, index 124 is illustrated as a single index, index 124 may comprise a set of smaller indices. For example, a separate index can be used by each indexing engine.

Figure 4:
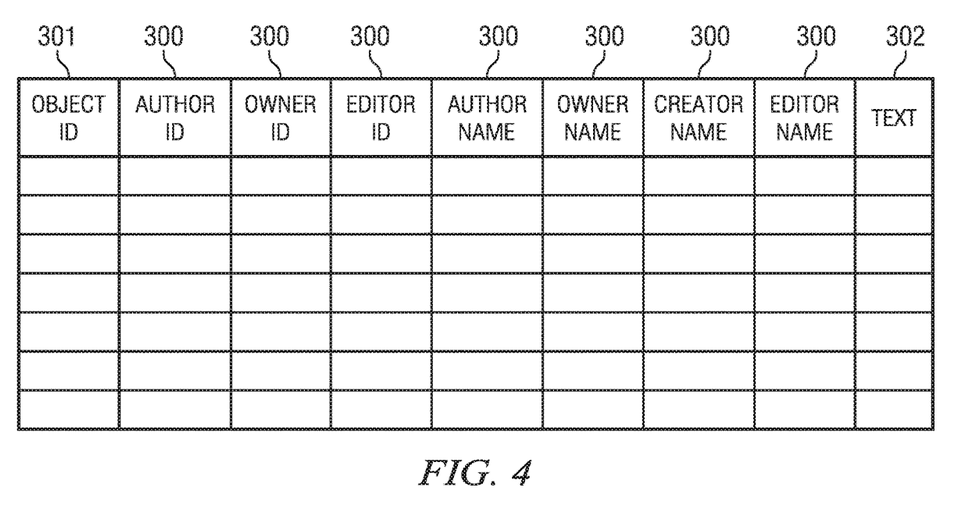
FIG. 4 depicts a diagrammatic representation of one embodiment of regions or fields for a portion of an index.

FIG. 4 is a diagrammatic representation of one embodiment of regions or fields for a portion of an index 124. Index 124 includes a list of some or all objects in repository 105 (FIG. 1), each identified by a unique identifier 301. Index 124 further includes a set of metadata regions 300 (also referred to as fields). A metadata field may include more than one entry for an object. The metadata fields can each have associated values in value storage locations within storage unit 118. In other embodiments, the values may be discarded. The index may include a list of dictionary terms contained in the metadata values of the object and pointers to where the metadata values corresponding to the field are stored. Index 124 may also include other regions for an object, such as a text region 302. Text region 302 may, for example, include a list of terms in the text of an object.

While shown as a single index, index 124 may be partitioned. In index partitioning, in one embodiment, the index of objects in repository 105 may be split into multiple indices, such that some objects are listed in one index partition while other objects are listed in the other index partitions. Index partitioning may also reduce resource usage and search time. Furthermore, separate indices may be maintained for metadata and text and/or different metadata regions. Index 124 can be stored according to any suitable storage scheme.

Figure 5:
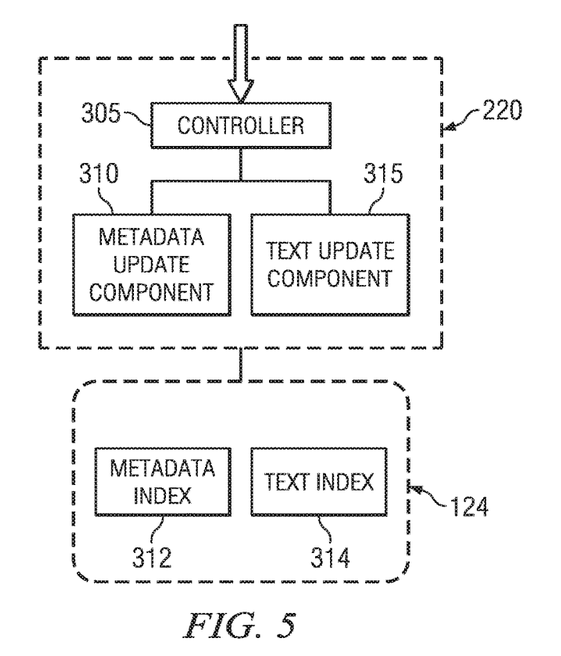
FIG. 5 depicts a functional block diagram illustrating one embodiment of an indexing engine.

FIG. 5 is a diagrammatic representation of one embodiment of an indexing engine 220 to maintain index 124. In this embodiment, Indexing engine 220 can include an indexing controller 305, a metadata update component 310 and a text update component 315. In this embodiment, index 124 is maintained as a separate metadata index 312, which contains metadata for objects in repository 105, and text index 314, which contains content text from objects in repository 105.

Indexing controller 305 receives indexing requests (e.g., from a distributor, another application or other source). In the embodiment of FIG. 5, the indexing request may include an instruction to add an object, delete an object, modify an object, or replace an object in index 124. The indexing request will typically also include the information to be added or changed, such as the full text content to be indexed and the associated metadata for the object. The indexing request may also contain derived metadata.

The text (derived text or full text content) of an indexing request may be a text file. It could be data exported from a database or other information system. Commonly, the text is the human-readable information within a document composed on a computer. In this scenario, a file such as a Microsoft Word document would be analyzed by a filtering step to extract the text, which can be stripped of unnecessary information such as fonts, styles, or page layout information.

The metadata portion of an indexing request is specifically provided by the application providing the indexing request. This might be data such as an identifier for the object, the date or time it was first added to the system, or the identity of the user who manages the object.

Derived metadata can include metadata inferred from the text content. For example, the filter that extracts the text from a PowerPoint presentation might also create metadata about the presentation. For example, the generated metadata may include the number of slides in the presentation, the title of the file, the name of the presentation author stored in the PowerPoint file, or the size of paper the presentation was designed to print on. More complex examples of derived metadata might include statistical analysis to generate a list of keyword or key concepts in the document, determining the subject person or company of the text, sentiment analysis (the positive or negative tone of the text), or identification of the language in which the text is written.

An indexing engine can receive an indexing request from an application, distributor or other source. An indexing request specifies an operation to be taken on index 124 for an object and any metadata or text for that action. For context, an application that generates an Indexing request might be a corporate document management system, a web site with a search capability such as an online store, or a desktop search program for email.

According to one embodiment, for example, an indexing request can take the form of an indexing object that includes a unique identification for an object, an operation, the metadata or text regions affected and the metadata and/or text for the index. By way of example, but not limitation, indexing operations may include adding, replacing, modifying and deleting information in the index, or combinations thereof. The following provides some exemplary operations that may be included in indexing requests.

AddOrReplace: this operation can be used to create new objects in the index. According to one embodiment, if the object does not exist, it will be created, but if an entry with the same object identification exists, then it will be completely replaced with the new data, equivalent to a delete and add.

AddOrReplace: this function may distinguish between content and metadata. If an object already exists, and metadata only is provided, the existing full text content is retained.

AddOrModify: this operation will update an existing object, or create a new object if it does not already exist. When modifying an existing object, only the provided content and metadata is updated. Any metadata regions that already exist which are not specified in the AddOrModify command will be left intact.

Delete: this operation will remove an object from the index, including both the metadata and the content.

Indexing controller 305, according to one embodiment, is a component which interprets the indexing request to determine how it should be processed. Indexing controller 305 can identify whether a text indexing command exists, and, if so, send the command with the necessary parameters to the text update component 315. Indexing controller 305 can likewise determine if any metadata indexing operations are required, and if so, send the command with necessary parameters to the metadata update component 310.

Text update component 315 is responsible for processing requests to index full text content. This may include tasks such as maintaining a dictionary of search terms, maintaining the internal search data structures, and updating the storage representation of the text portion of the search index in memory or on disk as appropriate, The text update component will typically support instructions such as add an object, replace an object, or delete an object.

Metadata update component 310 is responsible for processing requests to index metadata associated with an object in the Search Index. This may include building and maintaining dictionaries of search terms, maintaining internal search data structures, and updating the representation of the metadata portion of the search index in memory or on disk as appropriate. Metadata update component 310 will typically support instructions such as Add an Object, Replace an Object, or Delete an Object.

The embodiment of FIG. 5 is provided by way of example. Indexing engine 220 may include any number of other modules to update and search an index. Indexing engine 220 may be a portion of a larger program, such as a document management program, may be a separate program or may be implemented according any suitable programming architecture. In one embodiment, the processes of indexing engine 220 may be distributed across multiple computer systems.

Figure 6:
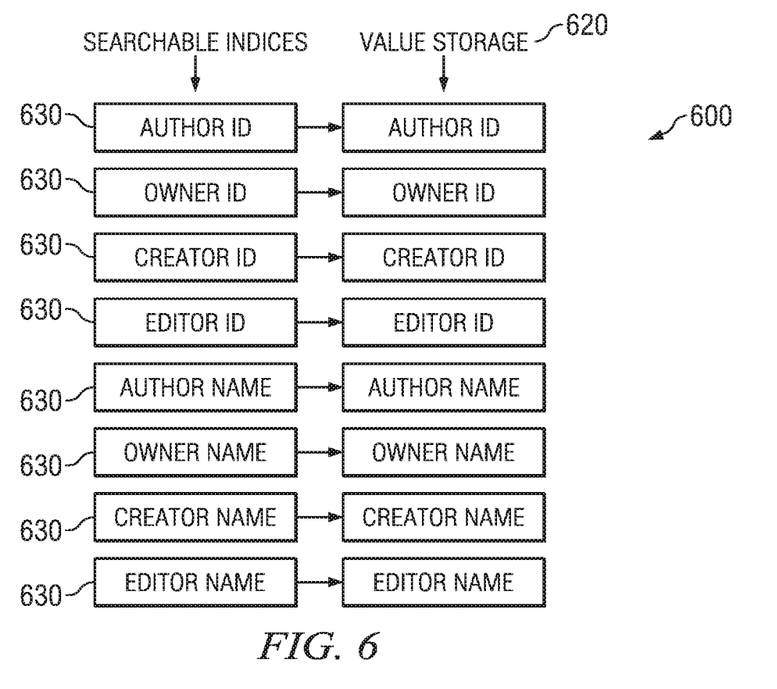
FIG. 6 depicts a diagrammatic representation of a set of indices corresponding to individual metadata fields in one exemplary embodiment.

FIG. 6 is a diagrammatic representation of a portion of one example embodiment of index 124 having indices for a set of searchable metadata fields 630. Further, each metadata field 630 may have a unique identity and corresponding value storage 620 storing values for the corresponding metadata field 630.

In search system 600, the number of distinct metadata fields 630 that are defined may have an impact on the performance or efficiency of the search system. For example, increasing the number of metadata fields 630 may increase the disk space or memory used, searching for keywords in numerous metadata fields 630 may be slower than searching for keywords in a single metadata field and creating a search query that spans many metadata fields may be more complex, more inefficient, and/or more difficult for a user than creating a search query that searches within a single or fewer metadata fields.

Applications that incorporate a search index 124 often use a large number of separate, independently searchable fields. Many of the metadata fields 630, although separate, may be logically related or associated with each other. Therefore, a user may desire to search within a plurality of searchable fields.

In the example of FIG. 6, the index 124 may include indices for the following metadata fields 630: the user ID of the person who wrote the document (Author ID); a user ID of the person who manages the document (Owner ID); the user ID of the person who added the document (Creator ID); the user ID of the person who last edited the document (Editor ID); the username of the person who wrote the document (Author name); the username of the person who manages the document (Owner name); the username of the person who added the document (Creator name); and the username of the person who last edited the document (Editor name).

Using the searchable fields, a user may desire to find or locate a document relating to turnips that the user knows is related to a person. However, the user may not know which metadata field 630 should be checked or searched. Further, the user searching the metadata fields 630 (e.g., Owner ID, Creator ID, etc.) may want to search by a User ID such as John, or by a User Name such a John Doe. However, with numerous metadata fields 630, a search query may be complex, confusing or inefficient. For example, a search query may be "Turnips AND (Owner ID: john OR Creator ID: john OR Author ID: john OR Editor ID: john OR Owner name: john Or Creator name: john OR Author name: john OR Editor name: john.)"

Therefore, to create a more efficient, desirable or manageable search system, the user may desire or require having a simpler way to search within similar or related searchable fields. This example embodiment therefore also includes an aggregate index that combines the information from multiple indices for individual ones of the searchable metadata fields 630. The metadata values, unlike in prior art aggregated indices, are maintained in separate storage locations and are identifiable as being associated with their respective metadata fields.

Figure 7:
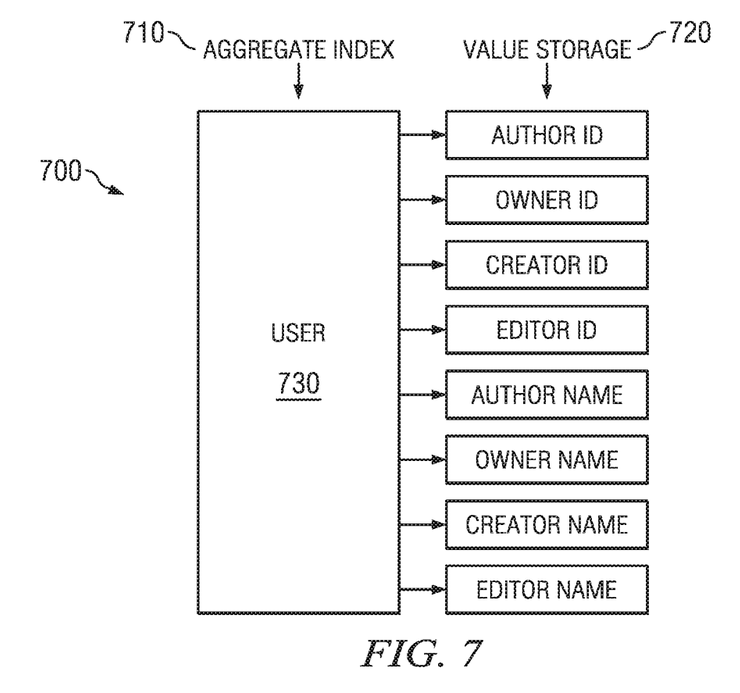
FIG. 7 depicts a diagrammatic representation of an aggregate index corresponding to a designated set of metadata fields in one exemplary embodiment.

FIG. 7 is a diagrammatic representation of one embodiment of an index 124 including an aggregate index 710, for a defined metadata field named "User." For each user, the metadata in all of fields 630 is aggregated or combined into a single field "User". The fields that are aggregated into the "User" field form a designated set of the many metadata fields that are associated with the objects, and may include all, or only a subset of these metadata fields. Because this is an aggregated index, the designated set will include at least two of the metadata fields. In a search interface of one embodiment, the user can be presented with the single field "User" to search in lieu of the separate fields "Author ID", "Owner ID", etc. Aggregate index 710 thereby combines the indices for the metadata fields of FIG. 6 into a single index. Unlike prior art aggregate indices, however, each metadata field retains its unique identity and corresponding value storage 720.

When retrieving values for the aggregate index 710, all the values for each metadata field associated with aggregate index 710 are retrieved. In other words, the search system can search a single index 710 for a particular term that may occur in any one of the metadata fields. The index identifies objects that have metadata fields containing the searched term. The system can then retrieve values from value storage corresponding to the objects identified in the index. The system may retrieve values from value storage corresponding to all of the metadata fields for the identified objects, or it may retrieve values from value storage corresponding to selected metadata fields for the identified objects. Aggregate index 710 reduces the overhead of having separate dictionaries and pointer lists for each of the individual metadata fields.

According to one embodiment, aggregate index 710 includes a single dictionary and object list that identifies those objects which have metadata containing particular terms (or values). For a given term, for instance "John," aggregate index 710 can point to each object for which any one of the metadata fields contains the term "John." Thus, for example, aggregate index 710 may identify "John" as occurring in the "User" metadata (the aggregated metadata for "Author ID", "Owner ID", "Creator ID", "Editor ID", "Author name", "Owner name", "Creator name" and "Editor name") for object 12345. In one embodiment, aggregate index 710 points to value storage locations that store values associated with object 12345 for each of the metadata fields "Author ID", "Owner ID", "Creator ID", "Editor ID", "Author name", "Owner name", "Creator name" and "Editor name". In another embodiment, aggregate index 710 may point to an identifier of the object (object 12345), or a storage location that stores pointers to the value storage locations for the corresponding metadata values (i.e., the values for "Author ID", "Owner ID", "Creator ID", "Editor ID", "Author name", "Owner name", "Creator name" and "Editor name").

A user may therefore perform a simple search query such as "User: john" to identify all objects which have individual metadata values that include the search term "john". The search term may occur in one of the metadata fields, or it may occur in several. As noted above, the system may be configured to return all of the metadata values. These values could be delimited or parsed to identify the specific individual, non-aggregated metadata fields with which each of the values is associated. This may be accomplished using pointers, the manner in which metadata values are stored, or other mechanisms. The user can therefore determine in which of the metadata fields "john" appears. Thus, in the example above, the user's query ("User: john") may result in the retrieval of all of the stored metadata values for object 12345, from which the user might determine that the value "John Doe" is stored for metadata field "Author ID", and the value "John Q. Public" is stored for metadata field "Editor ID".

The system may alternatively be configured to return selected metadata values. The user could therefore search, for example, for the owners of objects for which "john" is contained in any of the corresponding metadata values. In the example above, object 12345 has metadata values that contain "john". Consequently, this search would return the value of "Owner ID" for object 12345. This value may or may not contain the search term "john". For instance, the value of "Owner ID" may be Jane Smith. "Jane Smith" would therefore be returned because at least one of the metadata values associated with object 12345 contains the term "john".

Since aggregate index 710 combines the indices for the metadata fields, search queries examining all or a majority of value storage 720 may be more efficient and/or faster than search queries that operate on individual indices for corresponding searches of the metadata fields. In addition, aggregate index 710 may have more efficient storage than multiple smaller indices in that less overhead memory or disk space may be required for the single aggregate index than is necessary for multiple indices for the individual metadata fields.

In some embodiments, the search system may place restrictions or limits on what types of metadata fields may be combined into aggregate index 710. For example, in one embodiment, a metadata field including text may not be combined with a metadata field including integers, because the search features of integers and text may be different. These and other checks and restrictions may be implemented to prevent, limit or reduce mismatches between metadata fields with different types or search criteria.

Figure 8:
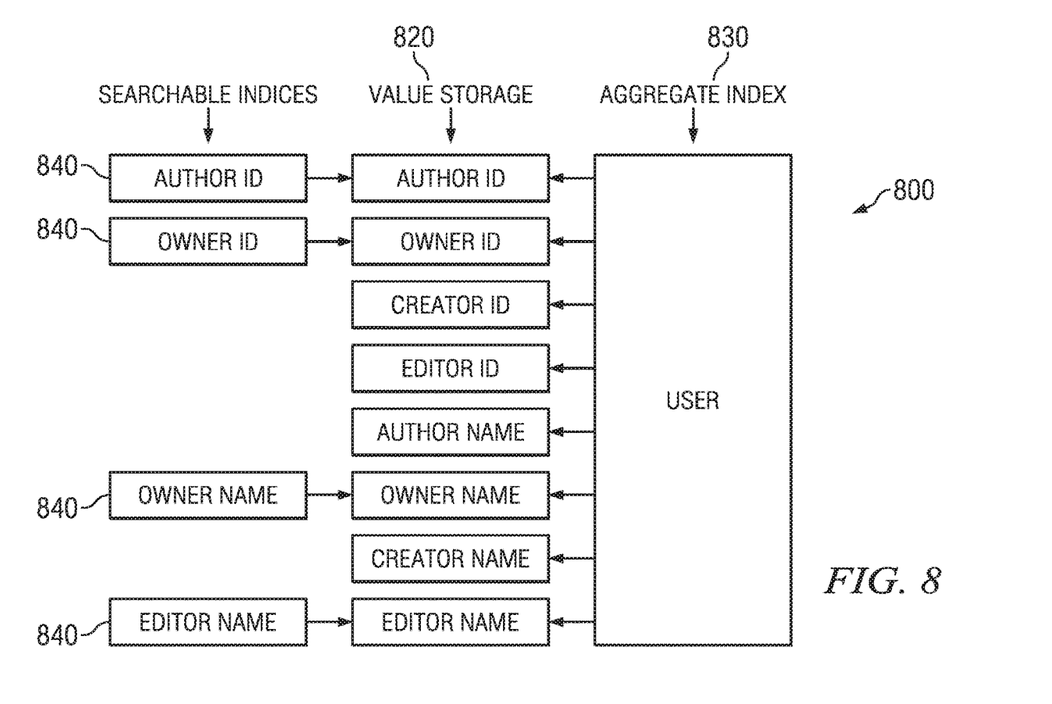
FIG. 8 depicts a diagrammatic representation of a set of indices, including aggregate and metadata-specific indices in one exemplary embodiment.

FIG. 8 is a diagrammatic representation of another embodiment of index 124. In this embodiment, a search index system 800 includes an aggregate index 830 and a plurality of indices 840 for a plurality of individual metadata fields. Aggregate index 830 may be configured to operate, for example, in the same manner described above for aggregate index 710. Thus, aggregate index 830 is searchable for terms that are contained in the values for any of the metadata fields included in the index (e.g., "Author ID", "Owner ID", "Creator ID", "Editor ID", "Author Name", "Owner Name", "Creator Name" and "Editor Name"). Aggregate index 830 may identify the objects associated with the relevant metadata values, it may identify which of the value storage locations 820 contains the relevant metadata values, or it may indicate the appropriate metadata values in some other manner.

Each of individual indices 840 includes a dictionary of terms that are found in the corresponding metadata fields. For instance, the "Author ID" index includes only terms that are found in the "Author ID" metadata field, and the "Owner ID" index includes only terms that are found in the "Owner ID" metadata field. Indices 840 identify the metadata values that contain the terms listed in the dictionaries. This may be accomplished in various different ways, such as by providing pointers to the storage locations in which the values are stored in value storage 820. While aggregate index 830 allows a user to easily search for a term that may occur in any of the aggregated metadata fields, it does not limit the search to particular fields. As a result, if the user wishes to find only those objects that contain "john" in the "Author ID" field, a search result generated by searching the aggregate index would have to be further filtered to exclude items in which the searched term occurred in fields other than "Author ID". Individual indices 840 enable the user to search for terms that appear in specific metadata fields, such as "Author ID". If the searched term occurs for an object in a field (e.g., "Owner ID") other than the searched field ("Author ID"), but not in the searched field itself, no result will be returned for that object.

In one embodiment, an aggregate metadata field may be defined. Metadata values associated with the aggregate metadata field may include all of the metadata values for metadata fields that are indexed by the aggregate index. For example, if the aggregate index contains terms from the "Author Name", "Owner Name", "Creator Name" and "Editor Name" metadata fields, the aggregate metadata field includes metadata from the "Author Name", "Owner Name", "Creator Name" and "Editor Name" fields. Just as metadata values corresponding to these fields are combined in the aggregated index, the values of the fields are combined and stored in value storage locations corresponding to the aggregated metadata field. In this embodiment, a search for a particular term in the aggregated index could be used to retrieve metadata values corresponding to the individual metadata fields (e.g., "Author Name", "Owner Name", etc.), the aggregated field, or all of the metadata fields associated with an identified object.

In one embodiment, the configuration information for an aggregate index may be contained or located in a configuration file of the search system. In other example embodiments, implementations using the search system may include storing the configuration file for the aggregate index in a database, using a program interface to control the settings of the database and/or the aggregate index, or using naming conventions for the aggregate index or the database.

In another embodiment, the aggregate index may be formed using pattern matching, rules or correlations. For example, the metadata within the searchable indices may be derived or correspond with an address book application, and may include metadata fields with names such as: Address number, Address_street, Address_city, Address_state, and zip code. This embodiment may use pattern matching, rules or correlations to construct or form an aggregate index, for instance, named "location", which indexes a plurality of metadata fields that have names starting with the string "Address_".

In another exemplary embodiment, more complex patterns, rules and/or correlations may be possible. For example, the aggregate index named Location may include a metadata field named "ZIP" and all metadata fields starting with the string "Address_", except for the metadata fields "Address_Country" and "Address Phone." Such an aggregate index may be implemented using a configuration setting or search string such as, "AGGREGATE Location Zip, Address_*, !Address_Country, !Address Phone." In other embodiments, various types of rules and pattern matching may be used to implement the configuration of the aggregate index.

As objects are added to the search system and search indices for the metadata fields which are indexed by the aggregate index, the values of the corresponding metadata fields may be added to the value storage. The aggregate index may thereby be updated to reflect or include the related metadata values of the added objects. If an object that has metadata values indexed by the aggregate index is deleted from the search index, the values for the appropriate metadata fields are deleted from the value storage, thereby updating the aggregate index. If objects that affect the values of the metadata fields indexed by the aggregate index are modified, then the corresponding value storage may be modified. As a result, the aggregate index is updated to reflect the modified values.

If a metadata field is created that meets one or more definition criteria for inclusion in the aggregate index, then the value storage for the new metadata field is created, and the new metadata value may be indexed as part of the aggregate index. If a metadata field indexed by the aggregate index is deleted, the value storage for the deleted metadata field is deleted, and the references to the values contained within the deleted metadata fields are removed from the aggregate index.

If a new aggregate metadata field is defined, an aggregate index is created that references the value storage for all the metadata fields associated with the aggregate index. Depending on the example embodiment, creation of an aggregate index may result in the deletion of the searchable indices for the associated metadata. If an existing aggregate metadata field is deleted, the aggregate index is deleted. In different embodiments, deleting the aggregate index may result in generating separate searchable indices for each of the metadata fields previously indexed by the aggregate index. If the list of metadata fields that comprise the aggregate index is modified, the aggregate index may be updated to reference the value storage for the modified list of metadata fields.

In further example embodiments, the aggregate index may be constructed for any available metadata fields. Accordingly, the metadata fields within the aggregate index may be changed. In other embodiments, metadata fields may be split from the aggregate index and new aggregate index may be constructed or formed for the split metadata fields. Accordingly, the configuration of the aggregate index or new aggregate indices may be change repeatedly without any loss of the searchable indices for the metadata fields.

Further embodiments may include an aggregate index supplementing existing searchable indices for the metadata fields instead of replacing the searchable indices. Accordingly, a user or automated processor may construct a search that examines or determines the aggregate index to find or locate the results in any of the metadata fields.

The user or automated processor may also construct a search against a specific metadata field if required or desired. In this case, the benefit of reduced memory or disk space may not be realized, but the simplification of search queries and search performances may still be available.

Figure 9A:
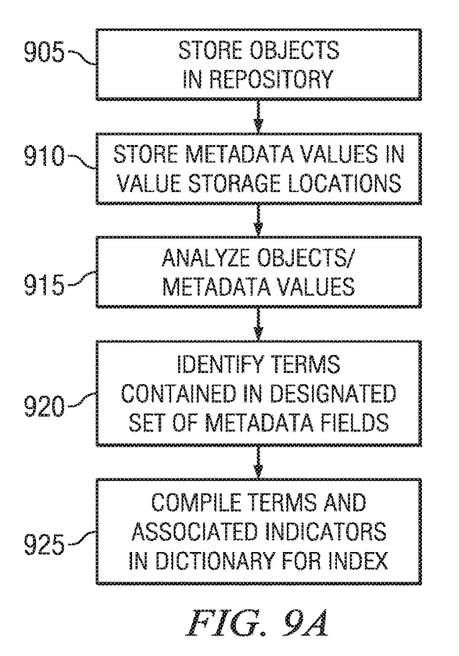
FIGS. 9A and 9B depict flow diagrams illustrating methods for generating and using an aggregate index in one embodiment.
Figure 9B:
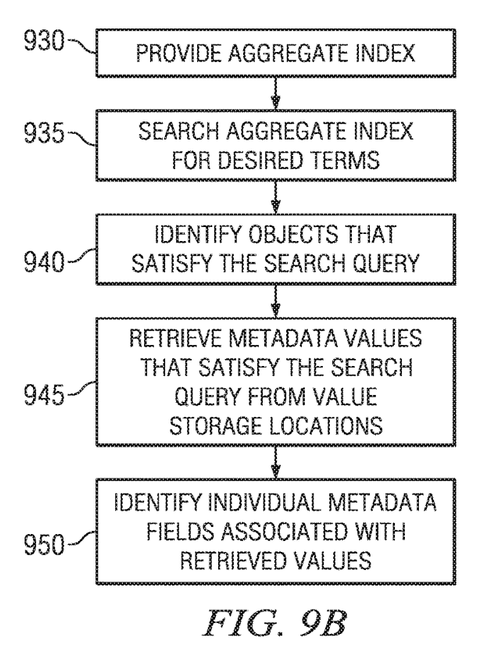

FIGS. 9A and 9B are flow diagrams illustrating the generation and use of an aggregate index in a search system in one embodiment. FIG. 9A depicts the generation of the aggregate index, while FIG. 9B depicts the use of the index.

Referring to FIG. 9A, the objects are initially stored in a repository such as is described above (905). Metadata values for each of the objects are stored in corresponding value storage locations in a storage unit (910). Each of the metadata values is associated with a corresponding field (e.g., a metadata field, text field, etc.). The search system analyzes the objects and/or metadata values (915) and identifies searchable terms that are contained in a designated set of the metadata values (920). These searchable terms are then compiled into a dictionary for the aggregate index (925). For each of the searchable terms in the index, one or more indicators are provided to identify objects and/or metadata values that contain the respective terms. These indicators may, for example, be pointers to the particular objects within the repository or value storage locations at which the identified metadata values are stored.

It should be noted that the method of FIG. 9A is exemplary and other steps may be implemented to generate an aggregate index in other embodiments. Further, this or similar methods can be used to generate additional indices. For instance, a search system may implement multiple aggregate indices, each of which is associated with a different designated set of metadata fields. The system may also implement metadata-specific indices along with the aggregate index/indices.

Referring to FIG. 9B, an exemplary method of using an aggregate index in a search system is depicted. In this embodiment, an aggregate index is first provided (930). The index includes terms that are contained in metadata values for the objects which correspond to a designated set of metadata fields. This aggregate index may, for example, be generated as described above in connection with FIG. 9A. The dictionary of the aggregate index is searched for one or more specific terms (935). The search query for the aggregate index may search for a single term, or it may search for a more complex combination of terms, examples of which are provided above. Objects that satisfy the search query are then identified (940). Alternatively, the search system may be configured to identify specific metadata values that satisfy the search query. Metadata values corresponding to the identified objects are then retrieved (945). In one embodiment, all of the metadata values associated with identified objects are retrieved. In other embodiments, only a subset of the metadata values may be retrieved. For instance, each of the metadata values that satisfies the search query may be retrieved, or a value associated with a specified metadata field may be retrieved for objects that satisfy the search query. In either case, the metadata fields with which the retrieved metadata values are associated are identified by the search system (950), which is not possible in conventional systems that combine the metadata values as well as the searchable terms for the metadata fields that are encompassed by the aggregate index.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved by, for example, distributed, or networked systems, components, and/or circuits. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A computerized search method, comprising:
configuring a search system with an index, the search system residing between a client device and a repository, the repository storing a plurality of objects, the search system comprising a server machine having a processor, a search engine, and a data storage unit containing the index, the index comprising a plurality of independently searchable metadata indices and at least one aggregate metadata index, wherein each of the plurality of independently searchable metadata indices has a corresponding defined field and contains one or more entries having corresponding metadata values for the defined field, wherein the at least one aggregate metadata index has a single defined metadata field that contains all of the metadata values corresponding to the one or more entries from at least two metadata fields of the plurality of independently searchable metadata indices, the aggregate metadata index including a dictionary, the dictionary containing terms including the metadata values from the at least two metadata fields, wherein for each of the terms, the aggregate metadata index points to each object of the plurality of objects in the repository for which any one of the at least two metadata fields contains the term;

receiving, from the client device, a search query for the aggregate metadata index, the search query specifying at least one term;

searching, by the search engine, the at least one term in the dictionary of the aggregate metadata index;

identifying, via the dictionary and the single defined metadata field of the aggregate metadata index, value storage locations of objects in the repository for which any one of the at least two metadata fields contains the at least one term specified in the search query; and providing, by the search system, a search result to the client device, the search result identifying the objects in the repository.

2. The computerized search method according to claim 1, wherein the configuring comprises generating the aggregate metadata index using pattern matching, rules, or correlations to associate particular metadata fields in the plurality of metadata indices.

3. The computerized search method according to claim 1, wherein the configuring comprises generating the aggregate metadata index, wherein generating the aggregate metadata index comprises:

analyzing the plurality of objects in the repository;
identifying search terms in the plurality of objects;
generating the dictionary for the aggregate metadata index; and
for each term in the dictionary, providing a pointer to each object of the plurality of objects in the repository for which any metadata field in the at least two metadata fields of the plurality of metadata indices contains the each term.

4. The computerized search method according to claim 1, wherein the data storage unit further comprises value storage locations, each metadata field of the at least two of the metadata fields associated with the single defined metadata field of the aggregate metadata index having a unique identity and a corresponding metadata value storage location in the data storage unit.

5. The computerized search method according to claim 4, wherein the aggregate metadata index does not store metadata values of the at least two of the metadata fields associated with the single defined metadata field of the aggregate metadata index.

6. The computerized search method according to claim 1, wherein the at least two metadata fields are logically related or associated to one another.

7. The computerized search method according to claim 1, wherein the at least one term comprises a combination of terms.

8. A computer program product comprising at least one non-transitory computer readable medium storing instructions translatable by at least one processor of a search system to perform:

configuring the search system with an index, the search system residing between a client device and a repository, the repository storing a plurality of objects, the search system comprising a server machine having a search engine, and a data storage unit containing the index, the index comprising a plurality of independently searchable metadata indices and at least one aggregate metadata index, wherein each of the plurality of independently searchable metadata indices has a corresponding defined field and contains one or more entries having corresponding metadata values for the defined field, wherein the at least one aggregate metadata index has a single defined metadata field that contains all of the metadata values corresponding to the one or more entries from at least two metadata fields of the plurality of independently searchable metadata indices, the aggregate metadata index including a dictionary, the dictionary containing terms including the metadata values from the at least two metadata fields, wherein for each of the terms, the aggregate metadata index points to each object of the plurality of objects in the repository for which any one of the at least two metadata fields contains the term;

receiving, from the client device, a search query for the aggregate metadata index, the search query specifying at least one term;

searching the at least one term in the dictionary of the aggregate metadata index;

identifying, via the dictionary and the single defined metadata field of the aggregate metadata index, value storage locations of objects in the repository for which any one of the at least two metadata fields contains the at least one term specified in the search query; and providing a search result to the client device, the search result identifying the objects in the repository.

9. The computer program product of claim 8, wherein the configuring comprises generating the aggregate metadata index using pattern matching, rules, or correlations to associate particular metadata fields in the plurality of metadata indices.

10. The computer program product of claim 8, wherein the configuring comprises generating the aggregate metadata index, wherein generating the aggregate metadata index comprises:

analyzing the plurality of objects in the repository;
identifying search terms in the plurality of objects;
generating the dictionary for the aggregate metadata index; and
for each term in the dictionary, providing a pointer to each object of the plurality of objects in the repository for which any metadata field in the at least two metadata fields of the plurality of metadata indices contains the each term.

11. The computer program product of claim 8, wherein the data storage unit further comprises value storage locations, each metadata field of the at least two of the metadata fields associated with the single defined metadata field of the aggregate metadata index having a unique identity and a corresponding metadata value storage location in the data storage unit.

12. The computer program product of claim 11, wherein the aggregate metadata index does not store metadata values of the at least two of the metadata fields associated with the single defined metadata field of the aggregate metadata index.

13. The computer program product of claim 8, wherein the at least two metadata fields are logically related or associated to one another.

14. The computer program product of claim 8, wherein the at least one term comprises a combination of terms.

15. A computerized search system, comprising:

at least one processor;

at least one non-transitory computer readable medium which is coupled to the at least one processor and which stores instructions;
a search system coupled to the at least one processor;
a data storage unit; and
wherein the instructions are translatable by the at least one processor to perform:
configuring the search system with an index, the search system residing between a client device and a repository in the data storage unit, the repository storing a plurality of objects, the index comprising a plurality of independently searchable metadata indices and at least one aggregate metadata index, wherein each of the plurality of independently searchable metadata indices has a corresponding defined field and contains one or more entries having corresponding metadata values for the defined field, wherein the at least one aggregate metadata index has a single defined metadata field that contains all of the metadata values corresponding to the one or more entries from at least two metadata fields of the plurality of independently searchable metadata indices, the aggregate metadata index including a dictionary, the dictionary containing terms including the metadata values from the at least two metadata fields, wherein for each of the terms, the aggregate metadata index points to each object of the plurality of objects in the repository for which any one of the at least two metadata fields contains the term;
receiving, from the client device, a search query for the aggregate metadata index, the search query specifying at least one term;
searching the at least one term in the dictionary of the aggregate metadata index;
identifying, via the dictionary and the single defined metadata field of the aggregate metadata index, value storage locations of objects in the repository for which any one of the at least two metadata fields contains the at least one term specified in the search query; and
providing a search result to the client device, the search result identifying the objects in the repository.

16. The computerized search system of claim 15, wherein the configuring comprises generating the aggregate metadata index using pattern matching, rules, or correlations to associate particular metadata fields in the plurality of metadata indices.

17. The computerized search system of claim 15, wherein the configuring comprises generating the aggregate metadata index, wherein generating the aggregate metadata index comprises:
analyzing the plurality of objects in the repository;
identifying search terms in the plurality of objects;
generating the dictionary for the aggregate metadata index; and
for each term in the dictionary, providing a pointer to each object of the plurality of objects in the repository for which any metadata field in the at least two metadata fields of the plurality of metadata indices contains the each term.

18. The computerized search system of claim 15, wherein the data storage unit further comprises value storage locations, each metadata field of the at least two of the metadata fields associated with the single defined metadata field of the aggregate metadata index having a unique identity and a corresponding metadata value storage location in the data storage unit.

19. The computerized search system of claim 18, wherein the aggregate metadata index does not store metadata values of the at least two of the metadata fields associated with the single defined metadata field of the aggregate metadata index.

20. The computerized search system of claim 15, wherein the at least two metadata fields are logically related or associated to one another.

* * * * *